United States Patent
Hagglund

(10) Patent No.: US 8,265,779 B2
(45) Date of Patent: Sep. 11, 2012

(54) AUTOMATIC BACKLASH ESTIMATION

(75) Inventor: Tore Hagglund, Lund (SE)

(73) Assignee: ABB AB (SE)

( * ) Notice: Subject to any disclaimer, the term of this patent is extended or adjusted under 35 U.S.C. 154(b) by 633 days.

(21) Appl. No.: 12/418,313

(22) Filed: Apr. 3, 2009

(65) Prior Publication Data

US 2009/0248180 A1   Oct. 1, 2009

Related U.S. Application Data

(63) Continuation of application No. PCT/EP2007/060450, filed on Oct. 2, 2007.

(30) Foreign Application Priority Data

Oct. 3, 2006   (SE) ....................... 0602059

(51) Int. Cl.
  *G05B 13/02*   (2006.01)
  *G01F 17/00*   (2006.01)
(52) U.S. Cl. ................. 700/45; 700/35; 700/52; 702/56
(58) Field of Classification Search .................. 700/245, 700/41, 45, 52; 74/490.01; 702/56
  See application file for complete search history.

(56) References Cited

U.S. PATENT DOCUMENTS

| | | | |
|---|---|---|---|
| 5,134,354 A | | 7/1992 | Yamamoto et al. |
| 5,204,602 A | | 4/1993 | Iwashita |
| 5,992,229 A | * | 11/1999 | Pyotsia et al. ................. 73/168 |
| 7,316,170 B2 | * | 1/2008 | Bader et al. ................. 73/865.9 |
| 7,363,109 B2 | * | 4/2008 | Jiang ............................. 700/245 |
| 2001/0005800 A1 | | 6/2001 | Shiba et al. |
| 2001/0033246 A1 | * | 10/2001 | Burchett et al. ............... 342/91 |
| 2006/0017415 A1 | * | 1/2006 | Kozai et al. ................... 318/630 |

FOREIGN PATENT DOCUMENTS

EP   0 666 642 A1   8/1995

OTHER PUBLICATIONS

Thornhill et al. (Detection and Diagnosis of Oscillation in Control Loops, Control Eng. Practice, vol. 5, No. 10, pp. 1343-1354, 1997.*
Shirazi et al. (Backlash Identification: A Two Step Approach, 15th Triennial World Congress, 2002 IFAC).*
International Report on Patentability, Jul. 8, 2007, 11 pages.
International Search Report and Written Opinion, Dec. 7, 2007, 10 pages.

* cited by examiner

*Primary Examiner* — Albert Decady
*Assistant Examiner* — Darrin Dunn
(74) *Attorney, Agent, or Firm* — St. Onge Steward Johnston & Reens LLC

(57) ABSTRACT

A method is disclosed for automatic estimation of backlash in a control system which includes a controller and a process to be controlled, wherein said controller is capable of performing integrating control of said process using one or more controller parameters to control a process output signal of said process with respect to a setpoint value thereof. The method involves monitoring said process output signal to determine a value reflecting momentary differences between setpoint value and actual value of said process output signal during a time interval; and estimating the backlash from said determined value and said one or more controller parameters.

15 Claims, 13 Drawing Sheets

```
Dt=0;eint=0;emax=0;          "initialization
For t=1:tstop,
    eold=e;
    e=ysp-yf;                "setpoint – filtered process output
    eint=eint+h*abs(e)       "Integrate e . h = sampling period
    if abs(e)>emax
       emax=abs(e);
    end
    Dt=Dt+h;                 "Integrate time
    if e*eold<=0             "zero crossing
       if Dt>5*Ti
          Dy=eint/Dt;
          if emax<2*Dy
             dhat=(K/Ti*Dt-1?Kp)*Dy;
          end
       end
       Dt=0;eint=0;emax=0;   "initialization
    end
end
```

*FIG. 10*

AUTOMATIC BACKLASH ESTIMATION

CROSS-REFERENCE TO RELATED APPLICATIONS

The present application is a continuation of pending International patent application PCT/EP2007/060450 filed on Oct. 2, 2007 which designates the United States and claims priority from Swedish patent application 0602059-8 filed on Oct. 3, 2006, the content of which is incorporated herein by reference.

FIELD OF THE INVENTION

The present invention generally relates to detection and estimation of backlash in a control system. In particular, the invention relates to a method for automatic estimation of backlash in a control system which includes a controller and a process to be controlled, wherein said controller is capable of performing integrating control of said process using one or more controller parameters to control a process output signal of said process with respect to a setpoint value thereof. The invention furthermore relates to an associated apparatus, control system and computer program product for such automatic estimation of backlash.

BACKGROUND OF THE INVENTION

Any control system comprises one or more controllable members by means of which a process is controlled. A control valve is perhaps the most common example of such a controllable member. Control valves are subject to wear, as is well known to anyone that has been involved in industrial control. After some time in operation, this wear results in friction and backlash that deteriorate the control performance. Therefore, valves have been identified as the major source of problems at the loop level in process control.

Valves with a high level of static friction (stiction) results in stick-slip motion that causes the control loops to oscillate. As the amount of friction increases, so does the backlash in the linkage mechanism in the positioner and actuator of the valve. The backlash adds a time delay to the control loop which deteriorates the control. Since control loops in process control applications are often coupled to surrounding control loops, there is also a risk that the disturbances caused by backlash in one loop will propagate to other loops.

When the stiction or backlash becomes large, the valve should, of course, be repaired or replaced. However, this can normally not be done without interrupting the process. For this reason, and other economical reasons, it is of interest to try to keep the valve running for as long time as possible. Stiction and backlash can be compensated for using available methods, provided that an extent or amount of the stiction or backlash is known to the compensation method used.

Even though the problems caused by stiction and backlash are severe, they are often not discovered by operators in process control plants. The main reason is that the reduction of personnel has resulted in a situation where each operator simply has too many control loops to supervise. Therefore, research on procedures for automatic performance monitoring has been very active in the last decade. The industrial use of such procedures has also increased rapidly in recent years. As regards stiction, a plurality of automatic methods are known for detecting control loops with stiction. When it comes to backlash, on the other hand, no efficient automatic detection or estimation procedure is known in the prior art. Instead, a manual investigation has been required by the process control operator. One example of such a manual investigation according to the prior art will now be briefly described.

FIG. 1 shows a block diagram of a control loop with backlash, the control loop involving a controller C and a process P to be controlled. The controller C receives a setpoint value signal $y_{sp}$ and a process output signal y as inputs, and produces a control signal u as output. The controller output u is not directly input to the process P; rather, it goes through a backlash that gives the true process input $u_b$. FIG. 2 illustrates the function of the backlash, where the dead band caused by the backlash is denoted d. When the control signal u is reversed, the process input $u_b$ remains constant until u has passed the dead band d.

The amount of backlash in the control loop of FIG. 1 can easily be determined manually by the procedure shown in FIG. 3. In FIG. 3, the upper diagram shows the process output signal y, and the lower diagram shows the control signal u. The experiment starts with two step changes in the control signal u in the same direction. If the first step is sufficiently large, the effect of the backlash is not present in the second step. The third step is then made in the opposite direction. Now, the control signal u has to pass the whole backlash before the valve moves. If the last two steps are of the same size, the backlash is $d=\Delta y/K_p$, where $\Delta y$ is the difference between the process outputs after the second and the third step (see FIG. 3), and $K_p$ is the static process gain (also easily obtained from FIG. 3). This manual procedure may be used each time a control system operator inspects the control loop.

However, as has already been explained, there is an ongoing trend in various fields of industry to reduce the personnel in process control plants. Consequently, the times between manual inspections of the control loops may often be long. Therefore, it would have been favorable in various fields of industry to be able to detect and estimate the amount of backlash automatically, i.e. without any involvement by a human operator.

SUMMARY OF THE INVENTION

In view of the above, an objective of the invention is to solve or at least reduce the problems discussed above. More particularly, embodiments of the invention aim at providing automatic detection and estimation of the amount of backlash in a control loop. Moreover, an object is to make such automatic backlash estimation easy to implement in existing, actual process control applications. Thus, the present inventor has realized that such automatic backlash estimation should be based on normal operating data from the control system, i.e. no user input in the form of parameters or other guidance should have to be provided by the control system operator.

Generally, the above objectives are achieved by a method, apparatus, control system and computer program product according to the attached independent patent claims.

A first aspect of the invention is a method for automatic estimation of backlash in a control system which includes a controller and a process to be controlled, wherein said controller is capable of performing integrating control of said process using one or more controller parameters to control a process output signal of said process with respect to a setpoint value thereof. The method involves:

monitoring said process output signal to determine a value reflecting momentary differences between setpoint value and actual value of said process output signal during a time interval; and estimating the backlash from said determined value and said one or more controller parameters.

An embodiment of the method involves integrating a control error of said process during said time interval and determining said value as $$\Delta y = \int_{t_i}^{t_{i+1}} |e| dt / \Delta t,$$

where $\Delta t = t_{i+1} - t_i$ and $e = y_{sp} - y =$ [setpoint value of said process output signal]−[actual value of said process output signal].

In an embodiment of the method, a start time of said time interval is determined by detecting a first zero crossing of said process output signal with respect to its setpoint value, and an end time of said time interval is determined by detecting a second zero crossing of said process output signal with respect to its setpoint value.

Advantageously, the backlash is estimated as $$\hat{d} = \left(\frac{K}{T_i}\Delta t - \frac{1}{K_p}\right)\Delta y,$$

where
$\hat{d}$ is an estimation of a deadband caused by the backlash,
K and $T_i$ are controller parameters used by said controller for performing integrating control of said process,
$\Delta t$ is said time interval,
$\Delta y$ is said value reflecting momentary differences between setpoint value and actual value of said process output signal, and
$K_p$ is a static process gain of said process.

One embodiment involves setting $K_p$ to a predetermined constant, such as substantially equal to 1.

Typically, the backlash is caused by a controllable member such as a mechanical, magnetic, electric, pneumatic or hydraulic valve in the control system. In such a case, the method may involve verifying that a control signal from said controller to said controllable member as well as said process output signal both are slowly changing signals, wherein said step of estimating the backlash is performed only upon successful verification.

More specifically, the verification of slowly changing signals may be performed by testing whether said time interval is long compared to a closed-loop time constant of said control system.

In one embodiment, the testing is performed by approximating said closed-loop time constant with a time constant among said one or more controller parameters and checking whether said time interval exceeds a threshold value calculated by multiplying said time constant with a predetermined constant. In other words, in this embodiment, the test is performed by checking whether $\Delta t \geq N^*T_i$, where N is a positive number which is selected appropriately in view of an actual implementation. Only if the test is successful will the backlash estimation be determined or relied upon. In one embodiment, N is set to 5.

Advantageously, the method further involves load disturbance prevention by finding a maximum absolute difference between setpoint value and actual value of said process output signal during said time interval, verifying that said maximum absolute difference does not exceed a threshold value being a function of said determined value reflecting momentary differences between setpoint value and actual value of said process output signal, and performing said step of estimating the backlash only upon successful verification.

The threshold value may be calculated by multiplying said determined value with a predetermined constant. Therefore, in this embodiment, load disturbance prevention is assured by checking whether the maximum absolute difference $e_{max} \leq M^*\Delta y$, where M is a positive number which is selected appropriately in view of an actual implementation, and determining or relying upon the backlash estimation only if the check is successful. In one embodiment, M is set to 2.

A second aspect of the invention is an apparatus for automatic estimation of backlash in a control system which includes a controller and a process to be controlled, wherein said controller is capable of performing integrating control of said process using one or more controller parameters to control a process output signal of said process with respect to a setpoint value thereof. The apparatus comprises:
  means for monitoring said process output signal to determine a value reflecting momentary differences between setpoint value and actual value of said process output signal during a time interval; and
  means for estimating the backlash from said determined value and said one or more controller parameters.

Advantageously, said means for monitoring and said means for estimating are implemented by a processor of said controller. Alternatively, said means may be implemented by a processing device (such as a CPU (Central Processing Unit) or DSP (Digital Signal Processor)) or any other electronic programmable and/or logic device or combination of devices in any suitable electronic equipment, including but not limited to a computer of any kind, or one or more integrated circuits.

A third aspect of the invention is a control system having a controller and a process to be controlled, wherein said controller is capable of performing integrating control of said process using one or more controller parameters to control a process output signal of said process with respect to a setpoint value thereof. The control system has:
  means for monitoring said process output signal to determine a value reflecting momentary differences between setpoint value and actual value of said process output signal during a time interval; and
  means for estimating the backlash from said determined value and said one or more controller parameters.

A fourth aspect of the invention is a computer program product comprising program code means adapted to perform the steps of any method according to the first aspect when executed by a processor.

The second to fourth aspects may generally have the same objectives and advantages, and the same or directly corresponding features, as the first aspect.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings, in which:

FIG. 10 illustrates a skeleton program code for the automatic backlash estimation method shown in FIG. 9.

DETAILED DESCRIPTION OF THE INVENTION

An embodiment of the present invention will now be described in more detail. Before this, however, a theoretical introduction to backlash will be given. After the description of the automatic backlash estimation of the disclosed embodiment, certain industrial tests will be briefly referred to. Finally, backlash compensation—which is advantageously performed based on the estimated backlash as made available thanks to the present invention—will be discussed.

Theoretical Introduction to Backlash

Figure 1:
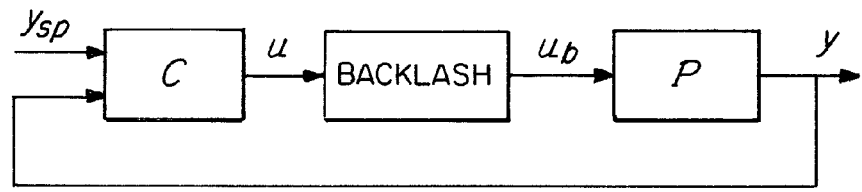
FIG. 1 is a block diagram of a control loop with backlash.
Figure 2:
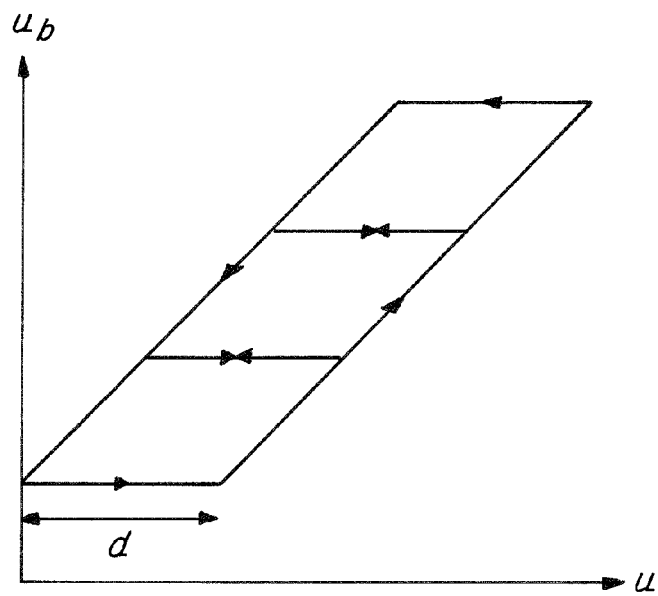
FIG. 2 illustrates the function of the backlash in the control loop shown in FIG. 1.
Figure 3:
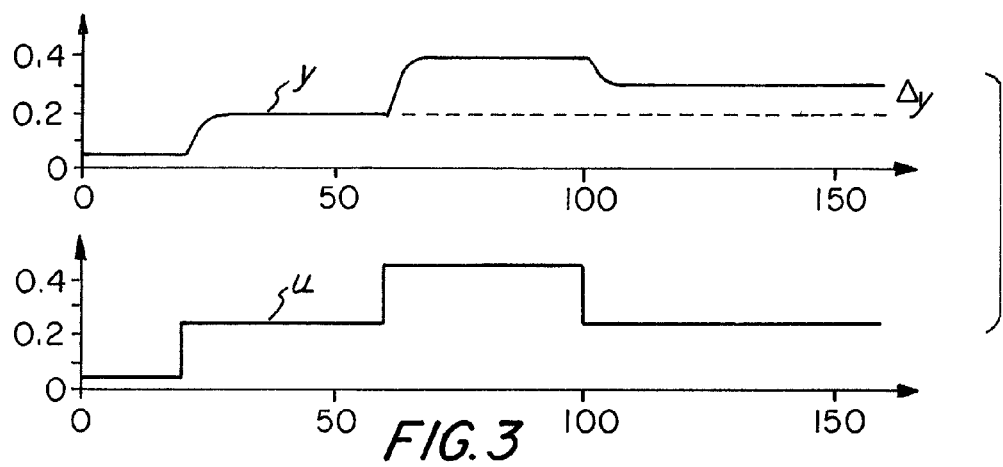
FIG. 3 illustrates manual backlash estimation.
Figure 4:
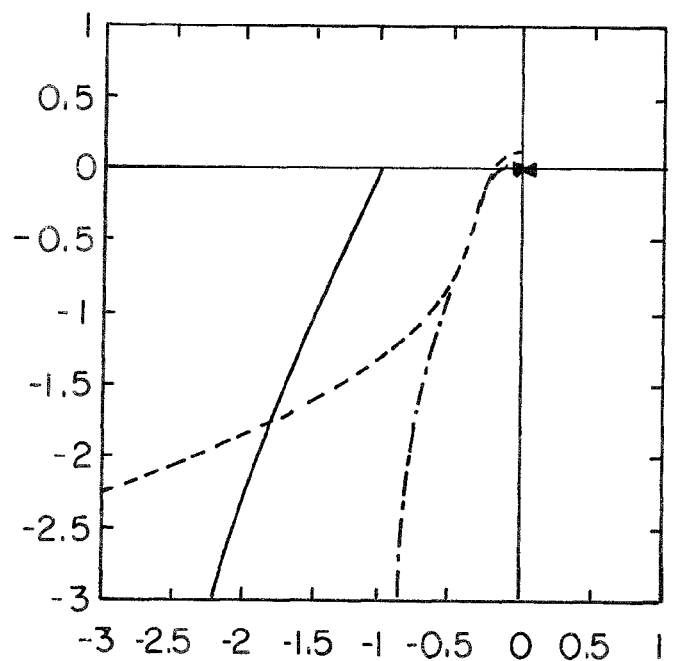
FIG. 4 illustrates the negative inverse of the describing function of a backlash.

Reference is again made to the control loop and deadband illustration shown in FIGS. 1 and 2. The describing function $Y_N$ of a backlash is:

$$\operatorname{Re} Y_N(\alpha) = \frac{1}{\pi}\left(\frac{\pi}{2} + \arcsin\left(1 - \frac{d}{\alpha}\right) + \left(1 - \frac{d}{\alpha}\right)\sqrt{\frac{d}{\alpha}\left(2 - \frac{d}{\alpha}\right)}\right) \quad (1)$$

$$\operatorname{Im} Y_N(\alpha) = -\frac{d}{\pi\alpha}\left(2 - \frac{d}{\alpha}\right),$$

where a is the input amplitude and d is the backlash given in FIG. 2. The negative inverse of the describing function of the backlash is shown in FIG. 4 (solid line). FIG. 4 also shows the Nyquist plots of two loop transfer functions obtained when the integrating process $P_1 = e^{-0.2s}/(s(1+0.8s))$ (dashed line) and the stable process $P_2 = 1/(1+s)^4$ (dash-dotted line), respectively, are controlled by PID controllers.

From this figure it can be concluded that integrating processes controlled by controllers with an integrator result in limit cycles. On the other hand, stable processes, reasonably tuned, will not give limit cycles.

Since d is divided by a at every position where it appears in (1), the shape of the describing function is independent of d. This has an interesting consequence. It means that the magnitude d of the backlash will influence the oscillation amplitudes, but since the intersection with the Nyquist plot occurs at the same position, the oscillation period will remain the same independent of the magnitude of the backlash.

Throughout this document, it is assumed that the controller C in FIG. 1 is a PID controller. This is most often the case in practice. However, the results presented herein can quite easily be modified to other controllers having integral action.

The PID controller used in the following examples has the structure $$u(t) = K\left(-y_f(t) + \frac{1}{T_i}\int(y_{sp}(t) - y_f(t))dt - T_d\frac{dy_f(y)}{dt}\right), \quad (2)$$

where u is the controller output, $y_{sp}$ is the setpoint, $y_f$ is the filtered process output, and the controller parameters are gain K, integral time $T_i$, and derivative time $T_d$. The controller has setpoint weights equal to zero in both the proportional term and the derivative term. This is common in industrial controllers. The process output is filtered through a second-order low-pass filter Gjghjghj $$Y_f(s) = \frac{1}{(1+sT_f)^2}Y(s), \quad (3)$$

where Y and $Y_f$ are the Laplace transforms of the process output and the filtered process output, respectively. A second-order filter is used to guarantee high-frequency roll off in the controller, and the filter-time constant is $T_f = T_d/5$. If a PI controller is used, it is suggested to use the filter-time constant $T_f = T_i/10$.

The following two examples illustrate the problems caused by backlash in the feedback loop.

Example 1

Control of an Integrating Process with Backlash

An integrating process with transfer function $$P_1(s) = \frac{1}{s(1+0.8s)}e^{-0.2s} \quad (4)$$

is controlled by a PID controller of the form (2) with parameters $K=1.9\ T_i=2.4\ T_d=0.67$.

The controller parameters are derived using a design method known as MIGO. A backlash of 5% (d=0.05) is introduced in the control loop.

FIG. 4 shows the Nyquist plot of the loop transfer function and the negative inverse describing function of the backlash. The curves intersect, which indicates that a limit cycle will occur. The describing function analysis predicts a limit cycle with an amplitude in the process output signal of 4.4% and an oscillation period of 7.7 s.

Figure 5:
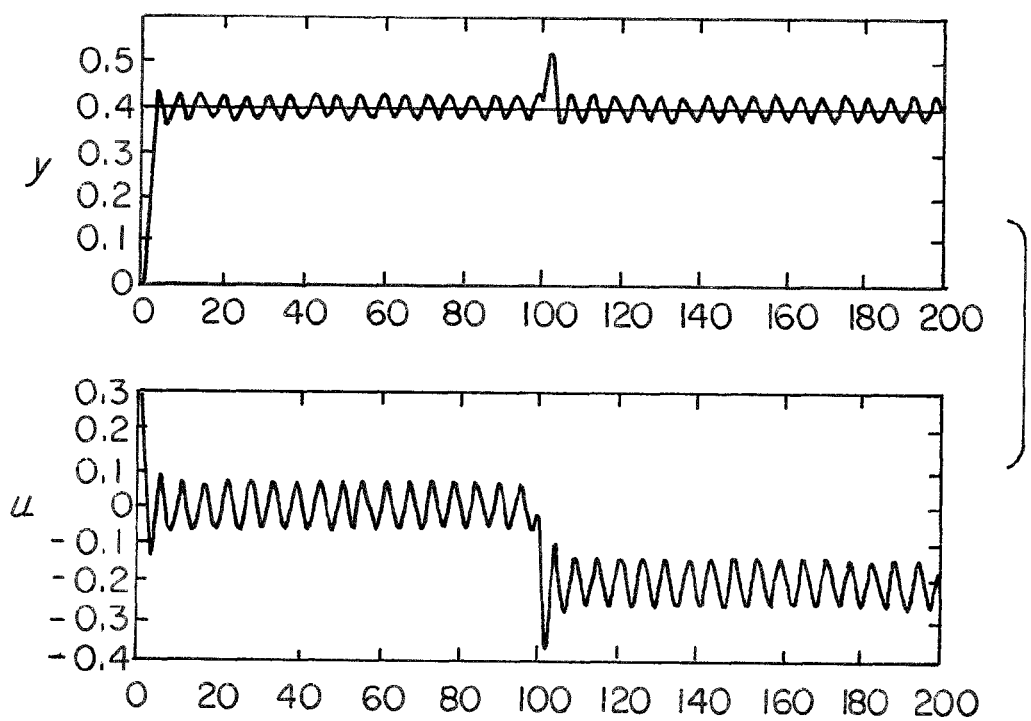
FIG. 5 illustrates control of an integrating process with backlash.

FIG. 5 shows the results of the simulations, where a setpoint change is made at t=0 and a load disturbance is applied at the process input at t=100. As seen in the figure, the control loop oscillates. The amplitude of the process output is 3.2%, and the oscillation period is 5.7 s. This is fairly close to what was predicted by the describing function analysis.

Example 2

Control of a Stable Process with Backlash

A process with transfer function $$P_2(s) = \frac{1}{(1+s)^4} \quad (5)$$

is controlled by a PID controller of the form (2) with parameters $K=1.2\ T_i=2.2\ T_d=1.2$.

The controller parameters are derived using the MIGO design method. A backlash of 5% (d=0.05) is introduced in the control loop.

FIG. 4 shows the Nyquist plot of the loop transfer function and the negative inverse describing function of the backlash. The curves do not intersect, which indicates that no limit cycle will occur.

Figure 6:
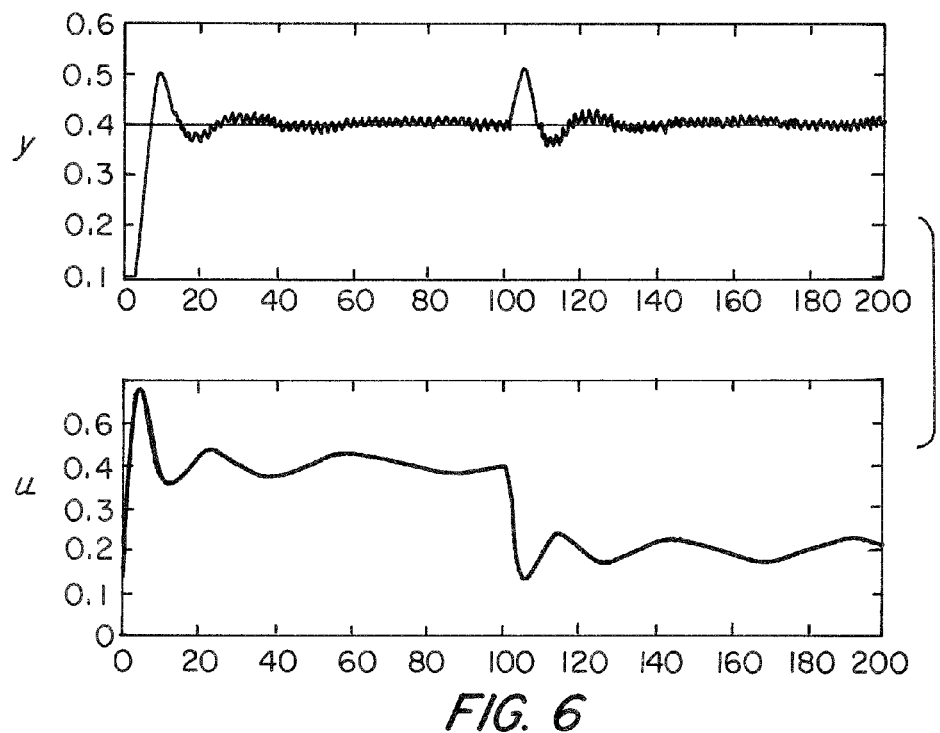
FIG. 6 illustrates control of a stable process with backlash.

FIG. 6 shows the results of the simulations, where a setpoint change is made at t=0 and a load disturbance is applied at the process input at t=100. Furthermore, noise with a standard deviation of 1% is added to the process output. The figure shows that even though there is no limit cycle as in the previous example, there is a severe deterioration of the control caused by the backlash. Because of the noise, the control error will never settle. The control signal has to pass the dead band every time the rate of change of the process input is to be reversed. This means that there will be low-frequency disturbances of the process output.

The describing function analysis and the examples illustrate the control problems that arise when backlash is introduced in the control loop. Control loops where integrating processes are controlled with controllers having integral action will go into a limit-cycle oscillation. These oscillations may be detected by oscillation detection procedures known per se.

Figure 7:
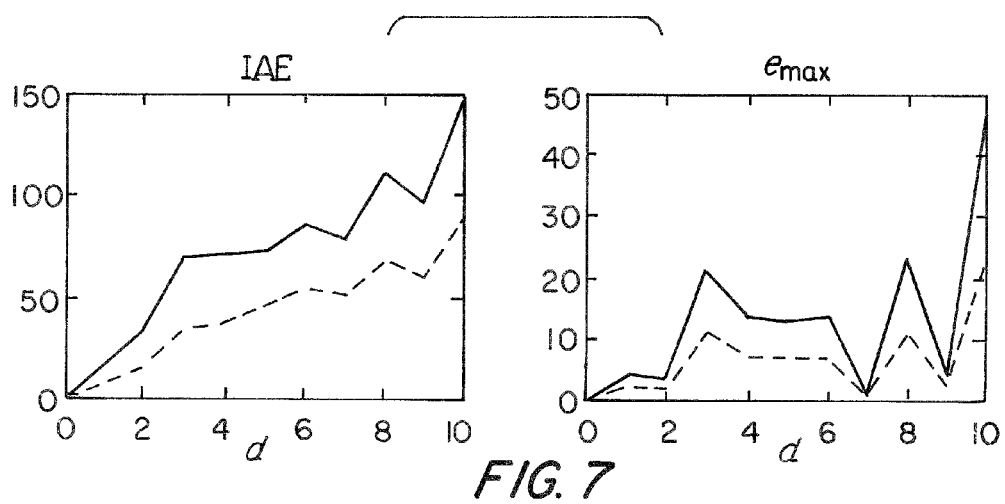
FIG. 7 illustrates control performance deterioration occurring when controlling a stable process with backlash.

Except for extremely lag-dominant processes, control loops for stable processes will normally not go into limit-cycle oscillations. However, the control performance is deteriorated even in these cases. This is illustrated in FIG. 7. The figure shows how the IAE ("Integrated Absolute Error") value (left diagram) and the peak error $e_{max}$ (right diagram) increase at load disturbances caused by backlash appearing in the control loop presented in Example 2 above. The solid line corresponds to a load change of 10%, and the dashed line to a load change of 20%. Both the IAE value and $e_{max}$ increase as the backlash d increases, even though $e_{max}$ is very noise sensitive. The increase is dependent on the magnitude of the load disturbances. The results agree well with those that are previously known.

The backlash introduces a dead time in the control loop. The length of this dead time is dependent on several states and parameters. The dead time appears only when the control signal action is reversed. The dead time is the time it takes for the control signal to pass the dead band. A low integral gain $K/T_i$ gives a long dead time. The dead time becomes short if the control error is large. It means that the dead time is shorter for large load disturbances than for shorter. This explains the results shown in FIG. 7.

Stable loops with backlash are normally not detected by oscillation detection procedures, since the oscillation amplitude is quite small.

A new automatic detection and estimation procedure for these processes will now be presented.

Automatic Backlash Estimation

A method for automatic backlash estimation according to one embodiment will now be described. The method treats only stable processes. As mentioned before, integrating processes with backlash will result in an oscillating control loop, which can be detected by procedures known in the art.

The automatic backlash estimation method generally operates on a control loop as shown in FIG. 1. The controller C is a PID controller (or any other type of controller with integral action), operable to generate a control signal $$u(t) = K \cdot e + \frac{K}{T_i} \int e \, dt + K \cdot T_d \frac{de}{dt}, \quad (6)$$

where $e = y_{sp} - y$

Figure 8:
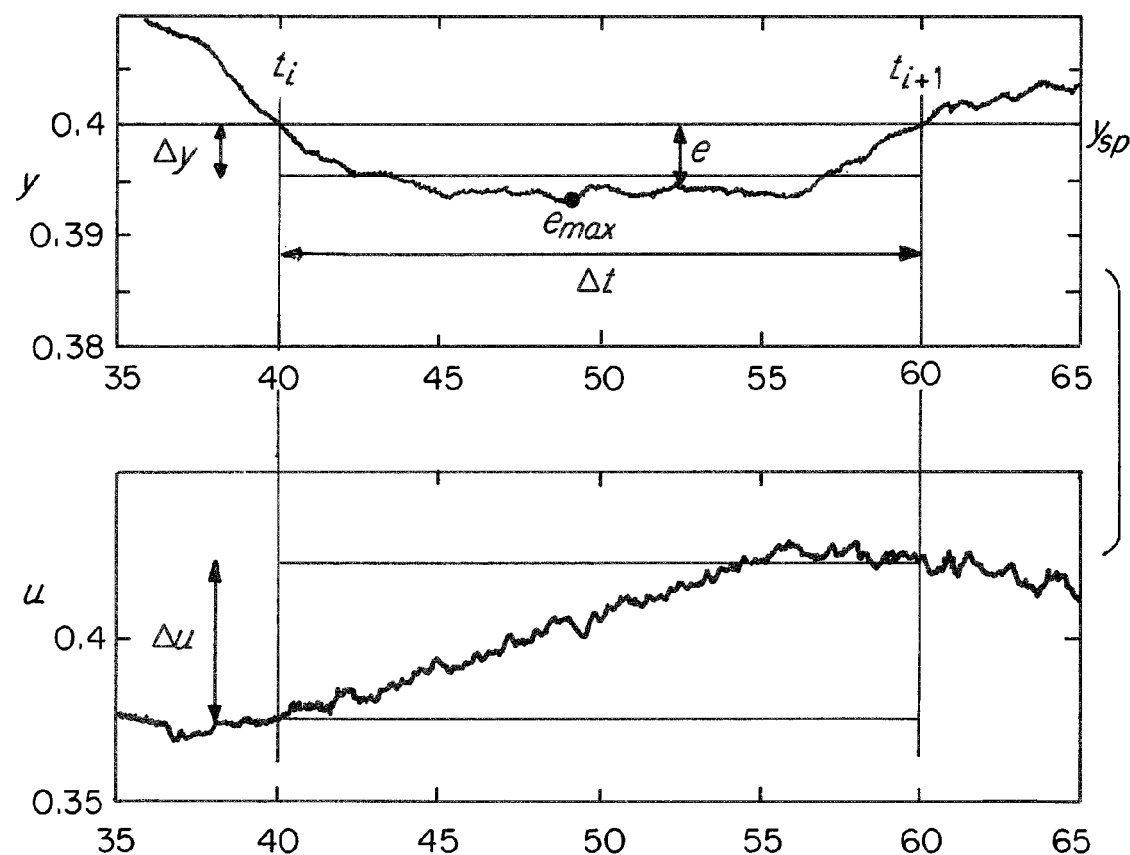
FIG. 8 illustrates a part of the diagrams shown in FIG. 6.

FIG. 8 shows a part of the simulation given in FIG. 6. The process output signal y has been filtered through the filter (3). This means that the process output signal presented in FIG. 8 is the signal that enters the PID algorithm. The signals show the typical pattern obtained when a stable process is controlled by a controller having integral action and when there is backlash in the control loop. The process output signal y is a distance $\Delta y$ from the setpoint while the control signal u drifts through the dead band caused by the backlash. When the control signal has changed an amount $\Delta u$, the process output signal is moved towards the setpoint $y_{sp}$. The time instances when the process output signal y crosses the setpoint are marked at t=40 and t=60 in FIG. 8. The time between these zero crossings is $\Delta t = t_{i+1} - t_i$.

The change $\Delta u$ of the control signal is mainly caused by the integral part of the controller C. This means that $$\Delta u \approx \frac{K}{T_i} \int_{t_i}^{t_{i+1}} |e| dt = \frac{K}{T_i} \Delta y \Delta t, \quad (7)$$

where $$\Delta y = \int_{t_i}^{t_{i+1}} |e| dt / \Delta t, \quad (8)$$

see FIG. 8.

If the signals change slowly, the process dynamics can be neglected, and the relation between the process output signal y and the control signal u is mainly determined by the static process gain $K_p$. In more detail, $K_p$ is the relation, after transients, between a change in y and a change in u, the change in the former being caused by a change in the latter. Thus, the relation is $$\Delta y = K_p \Delta u_{true}, \quad (9)$$

where $\Delta u_{true}$ is the part of $\Delta u$ where the backlash is closed and the valve moves. This means that $$\Delta u = \Delta u_{true} + d. \quad (10)$$

From Equations (7) to (10), the following equation for estimating the backlash is obtained:

$$\hat{d} = \Delta u - \Delta u_{true} = \frac{K}{T_i} \Delta y \Delta t - \frac{\Delta y}{K_p} = \left(\frac{K}{T_i} \Delta t - \frac{1}{K_p}\right) \Delta y. \quad (11)$$

The backlash estimator (11) assumes that the signals change slowly. A convenient way to check this is to see if $\Delta t$ is long compared to the closed-loop time constant of the entire control system (including the controller C and the controlled process P). Since the closed-loop time constant of the entire control system is typically not known, beneficial use is made of the fact that $T_i$, which is one of the controller parameters of the PID controller C and thus is known, is closely related to the closed-loop time constant. Therefore, the disclosed embodiment involves a step of verifying that both the control signal u and the process output signal y are slowly changing signals by testing whether $\Delta t \geq 5T_i$. Estimation is only performed if this criterion is met.

The information required to determine the backlash on-line is the controller parameters K and $T_i$, and the static process gain $K_p$. Further, it is necessary to measure $\Delta y$ from (8), i.e. to integrate the control error e between zero crossings, and the time $\Delta t$ between these zero crossings.

The fact that the process gain $K_p$ is used in the algorithm needs some consideration, since this gain is typically not known. On the other hand, the estimate $\hat{d}$ is quite insensitive to errors in the estimate of $K_p$. To see this, rewrite (11) to $$\hat{d} = K\left(\frac{\Delta t}{T_i} - \frac{1}{KK_p}\right)\Delta y. \quad (12)$$

The first term inside the brackets is always greater than 5, since it is assumed that $\Delta t \geq 5T_i$. For well-tuned controllers applied to processes that are not delay-dominated, the product $KK_p$ is normally larger than 0.5. This means that the first term in (12) dominates and that the backlash estimator (11) is insensitive to errors in $K_p$. Since industrial controllers normally work with normalized signals, $K_p=1$ is conveniently used as a default value.

It is important that the noise does not cause zero-crossings. Therefore, the process output signal y is not only filtered by the second-order filter (3), but an additional second-order filter is applied before the signal is treated in the estimation procedure. In the examples presented in this document, the time constant of this latter filter is $T_i/2$.

On-line procedures like this should have a security net. In the disclosed embodiment, one element of such a security net is load disturbance prevention, since such disturbances may deteriorate the backlash estimation. To check that the process output signal has a form similar to the one in FIG. 8, estimation is only performed when $e_{max} \leq 2\Delta y$, where $e_{max}$ is the absolute value of the largest control error in the interval $[t_1, t_{i+1}]$.

Other elements of this security net may have to be developed during industrial field tests.

Figure 9:
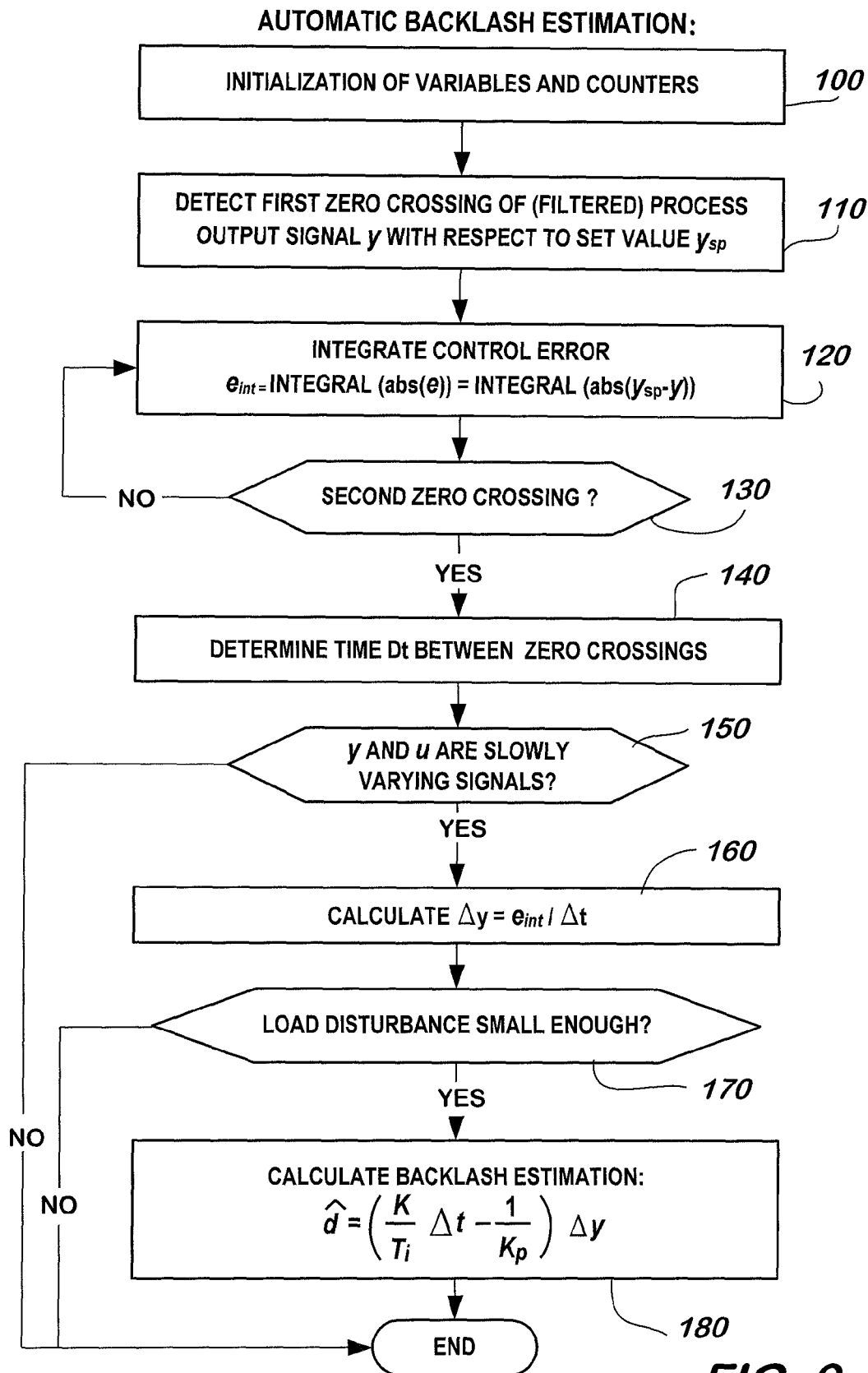
FIG. 9 illustrates a flowchart diagram of an automatic backlash estimation method according to one embodiment.

Thus, the automatic backlash estimation method according to this embodiment comprises the following steps, which are also shown in the flowchart diagram of FIG. 9:

In a first step 100, necessary variables and counters are initialized. Then, the process output signal y (filtered as described above) is monitored in step 110 for a first zero crossing with respect to the set value $y_{sp}$. Once the first zero crossing has been detected, the execution proceeds to step 120, where the control error e is integrated until a second zero crossing has been detected in step 130.

Then, in step 140, the time interval $\Delta t$ between the first and second zero crossings is determined. The afore-described check for slowly varying signals y, u is performed in the following step 150. The execution ends if the test fails; otherwise the execution proceeds to step 160, where $\Delta y$ is calculated as explained in (8).

Step 170 is the load disturbance prevention step which was explained above. If the load disturbance is deemed to be small enough, i.e. if $e_{max} \leq 2\Delta y$, the backlash estimation $\hat{d}$ is calculated in step 180; otherwise the execution ends.

A skeleton code describing the backlash estimator is given in FIG. 10.

The functionality of the automatic backlash estimation method may be performed by any suitable equipment which is available in an actual implementation. For instance, as will be seen later with reference to the industrial tests and FIG. 11, the functionality may be performed by appropriate programming of a processor or other logic device in the hardware equipment that implements the PID controller C (as realized by a PID1 controller 32 of a control loop 30 in FIG. 11, the PID1 controller having a programmable CPU 33 with associated memory 34 capable of storing program code and work data). Alternatively, again as seen in FIG. 11, the functionality of the automatic backlash estimation method may be performed by a conventional computer 50 (such as a personal computer, workstation, laptop computer or hand-held computer), when appropriately programmed and coupled to the controller C (PID controller 32) of the controlled process P.

Figure 11:
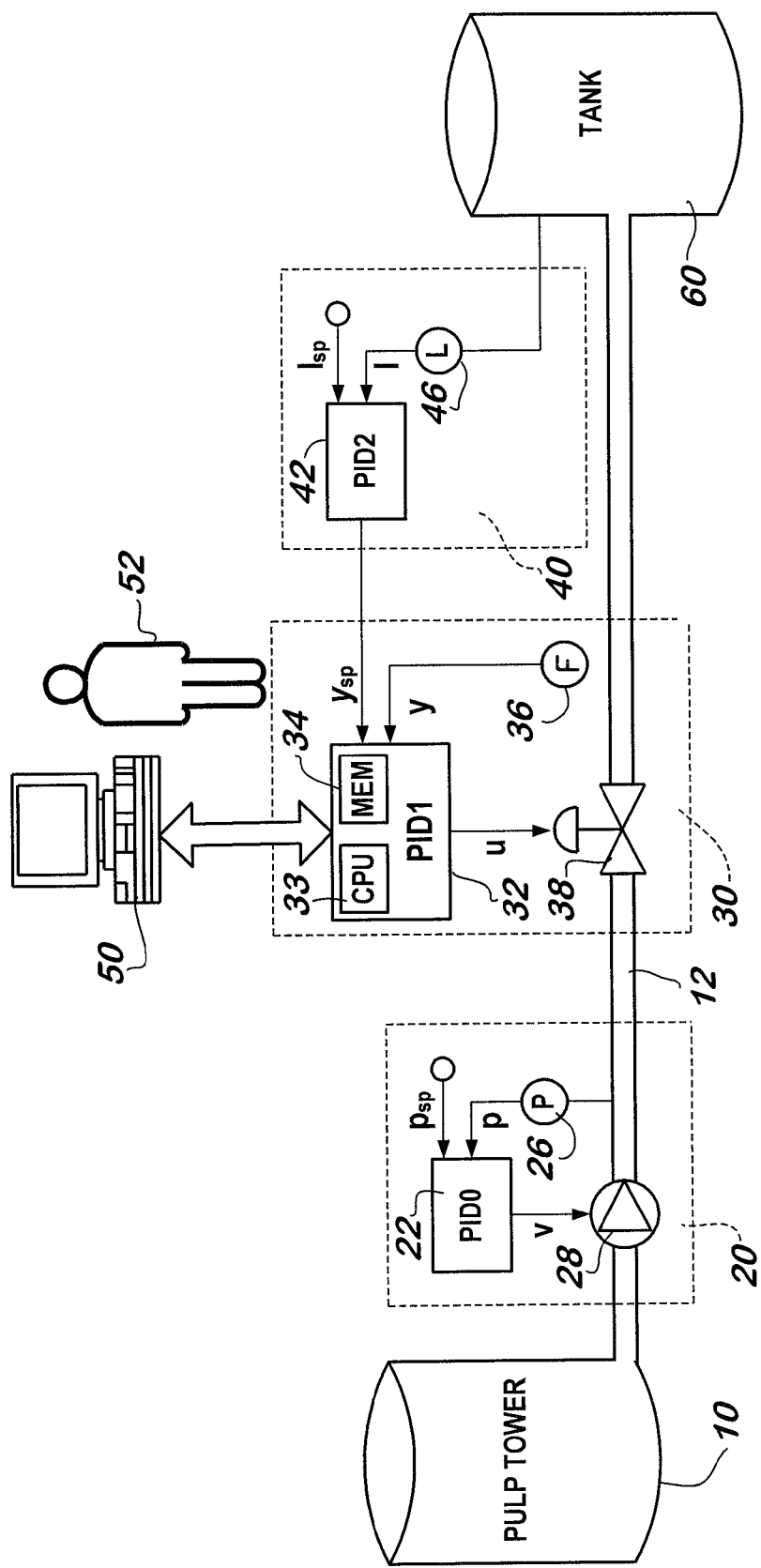
FIG. 11 is a schematic illustration of a control system as an example of an environment in which the present invention may be applied.

The result of the automatic backlash estimation method, i.e. the backlash estimation d, may be presented in any suitable manner to a control system operator (see 52 in FIG. 11), for instance by way of software running in the computer 50, and/or by way of a user interface of controller C (PID1 controller 32 in FIG. 11). The result may be used in different ways, as desired in an actual implementation. It may be used as a simple indication of detected backlash (for instance when $\hat{d}$ exceeds a threshold value indicative of noticeable backlash), or an estimation of the amount of backlash present, or as an alarm trigger to service/maintenance personnel that the controllable member (e.g. valve 38 in FIG. 11) needs service, repair or replacement, or as input data to compensation steps of a backlash compensation method performed in association with the backlash estimation method. See the last section of this description for further information on backlash compensation.

Thus, to conclude the above, a new automatic method (on-line procedure) for backlash estimation has been presented. It is given by Equation (12), and some further features are summarized in FIGS. 9 and 10. The estimation method is automatic, which is believed to be beneficial for its acceptance in the process control industry. The estimation method can be used in many ways. First of all, it can be used as a detection procedure in a way similar to oscillation detection procedures known per se. According to the method, the control performance between zero crossings is studied. It can be concluded that backlash is present in the loop if the rate of backlash detections gets high.

If backlash is detected, and if the estimated backlash values are close, then one can also draw a conclusion about the amount of backlash. This is necessary if the goal is not only to detect backlash, but also to compensate for it.

If there is stiction present in the control loop, the backlash estimated by the estimation method is the sum of the backlash and the dead band caused by stiction. This is believed to be a good feature, since a backlash compensator will then not only compensate for the backlash, but also for the stiction.

In the derivation of the backlash estimator above, it was assumed that a PID controller was to be used. However, it is straightforward for a skilled person to modify the method to other controllers having integral action.

Industrial Tests

The backlash estimation method has been tested on a flow control loop in a paper mill. This environment is schematically illustrated in FIG. 11, which has already been referred to above. The process section is a pipe 12 where pulp is transported from a recycling-pulp tower 10 to a tank 60. A PID controller (PID1) 32 controls the pulp flow through a valve 38 and therefore forms one control loop 30. The process output y is the pulp flow, measured in the range 0-900 m³/h by a flow detector (F) 36, and the controller output u is in the range 0-100%.

The setpoint $y_{sp}$ is external and is given by a level controller (PID2) 42 at the tank 60 downstream. This means that the flow controller 42 forms a slave control loop 40 in a cascade configuration. The pulp flow is driven by a pump 28 which is controlled by a pressure controller (PID0) 22 involved in another control loop 20 and using a pressure detector 26.

The flow and the pressure controllers interact. To reduce this interaction, the bandwidth of the flow loop, which normally is quite fast, has been reduced by introducing a low-pass filter with a time constant of 20 s in the loop.

Figure 12:
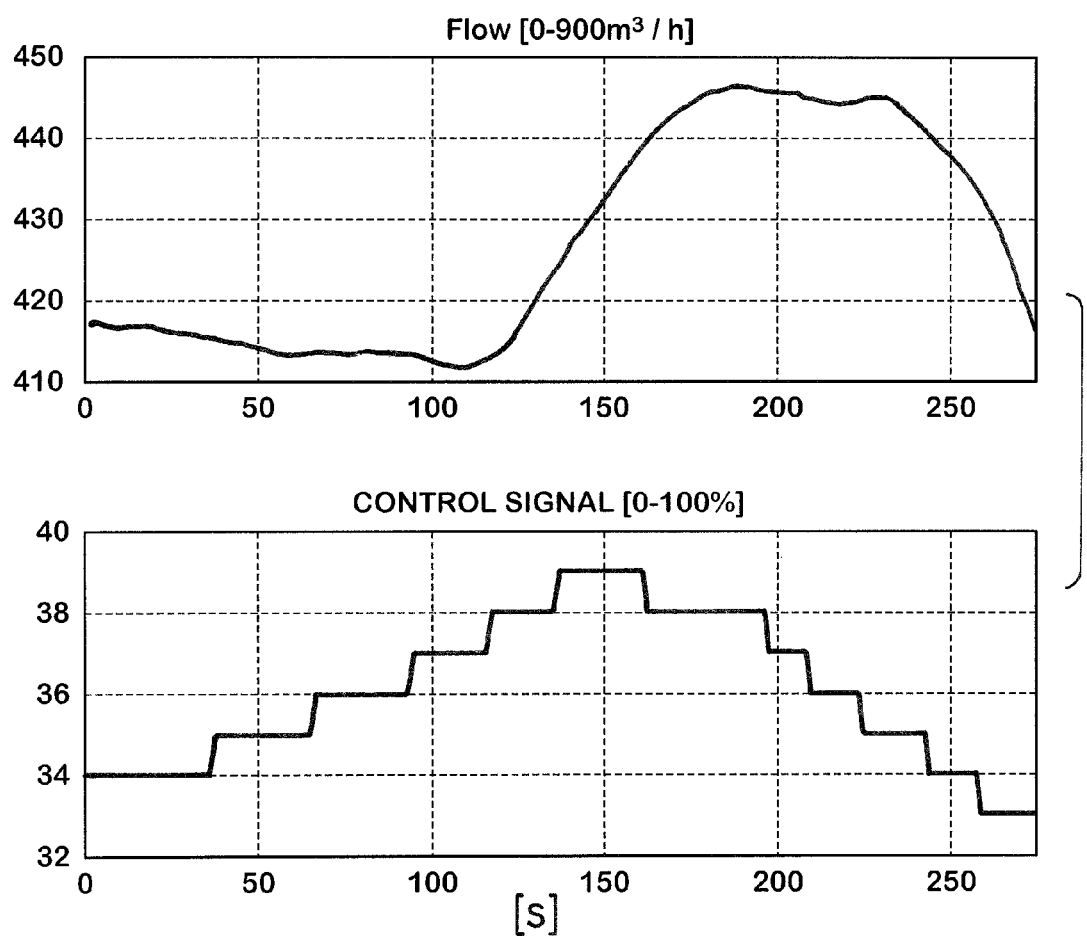
FIGS. 12-14 are diagrams from industrial tests performed in the environment of FIG. 11.

A manual test was performed to check the amount of backlash in the valve. The result is shown in FIG. 12. The controller output is first increased to ensure that the gap is closed. Since the flow increases, the gap is closed when the control signal is at the final value u=39%. The controller output is then reversed and decreased in steps of 1%. The first steps do not result in any flow decrease, indicating that the control signal is inside the dead band. However, the step made from the value u=36% gives a flow decrease, showing that the gap is closed near this value of the control signal. The test shows that the backlash is around d=3%.

The flow controller is a PI controller with parameters K=0.6 and $T_i$=28 s. The signals used in the controller are normalized to the range [0,1]. The static process gain was estimated to $K_p$=1.3.

Figure 13:
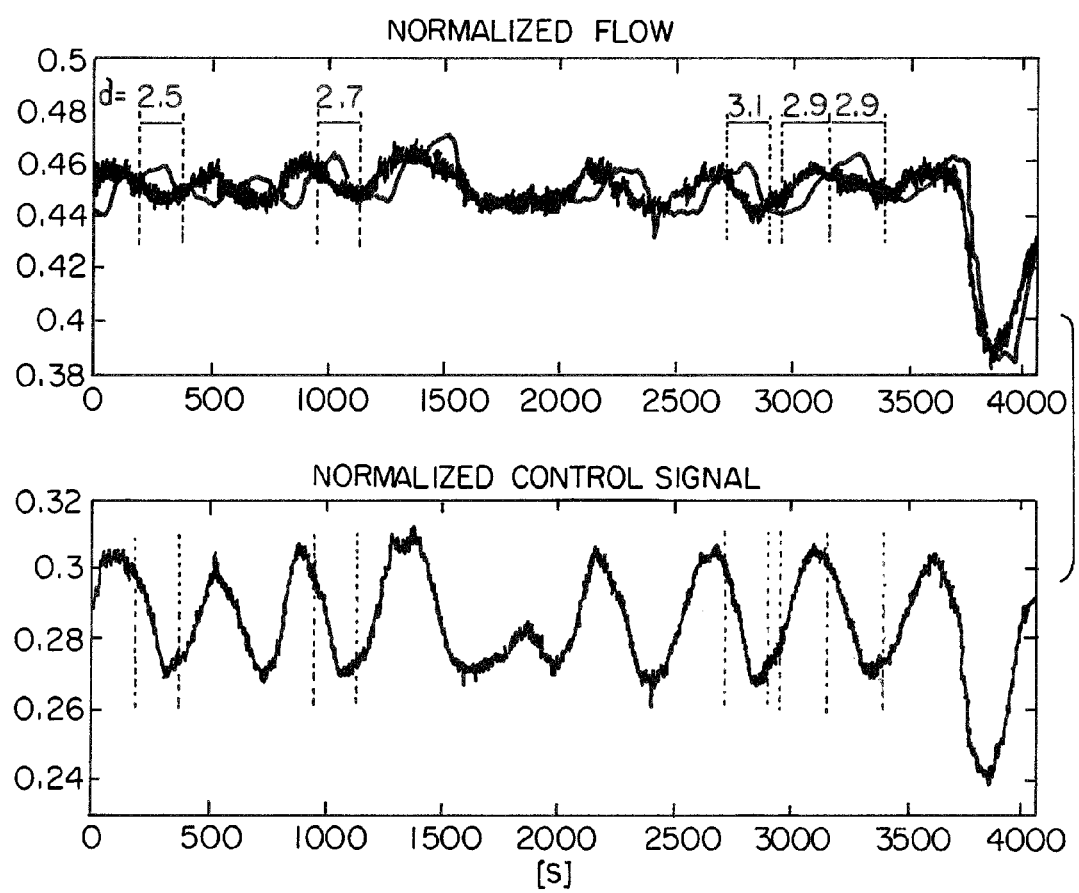

FIG. 13 shows the result of a recording made for about 4000 s. The upper graph shows the external setpoint (noisy signal) and the process output (flow). The lower graph shows the control signal. The estimated backlash values are indicated in the upper graph. The loop is oscillating because of the oscillating setpoint. The setpoint oscillations are probably generated by the flow variations caused by the backlash. FIG. 13 shows that backlash was detected five times during the test, with backlash estimates ranging from 2.5% to 3.1%. These estimates are close to those obtained from the manual tests in FIG. 12.

Setpoint variations may disturb the backlash estimator. If the test $e_{max} \leq 2\Delta y$ were not present, fifteen detections would have been obtained during the test, and especially the last two major setpoint changes would have given backlash estimates that are far too large.

Figure 14:
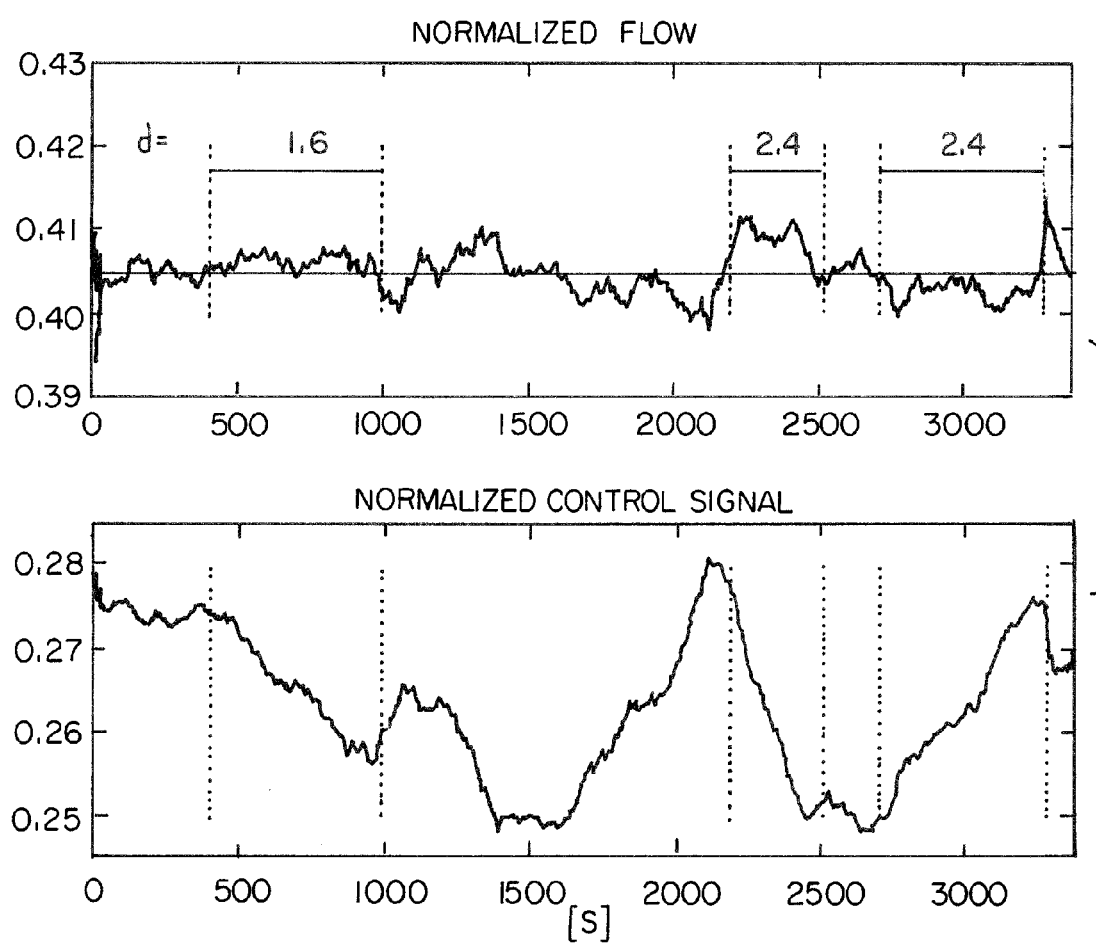

To get rid of the disturbances caused by the external setpoint, experiments with a fixed internal setpoint were also performed. FIG. 14 shows the results of such a test. The upper graph shows the constant internal setpoint and the process output (flow). The lower graph shows the control signal. The estimated backlash values are indicated in the upper graph.

Comparing FIGS. 13 and 14, it is clear that the oscillations caused by the external setpoint have disappeared. FIG. 14 shows that there are some low-frequency disturbances present. They are probably caused by interaction from the pressure control loop.

Three backlash detections were made during the experiments, with the estimates 1.6%, 2.4%, and 2.4%, respectively. These values are slightly lower than those obtained in FIG. 13. This is expected, since the setpoint variations in the previous example amplifies the effect of the backlash. Furthermore, already the derivation of the method and simulation examples conducted have shown that the backlash estimates are expected to be conservative.

To summarize, the industrial tests have shown that the backlash estimation method works also in an industrial environment with difficult low-frequency disturbances. To obtain a robust method for an actual implementation that is automatic in the sense that no user interaction is needed, additional elements of the security net may have to be added, as is well within reach of the skilled person.

Backlash Compensation

When it is discovered that a control valve has got so much backlash that the control is deteriorated, the best action to take is, of course, to replace or repair the valve. The fact that the amount of backlash normally increases with time makes this even more important.

However, to replace or repair a valve normally means that the production has to be stopped. For this reason, and for the economical reason that it is of interest to use a valve for as long time as possible, it is of interest to compensate for the backlash.

A control valve will normally not move on its own or when the control signal is constant, unless the actuator is undersized or the positioner is unstable. Therefore, the position of the control signal with respect to the backlash is given by the control signal and its history. This means that the backlash is an invertible nonlinearity.

One way to compensate for the backlash is to make the control signal jump through the backlash every time the control action is reversed. The compensation can be seen as a feedforward compensation $$u = u_{FB} + u_{FF}, \quad (13)$$

where u is the controller output, $u_{FB}$ is the feedback term, e.g. the output from the PID controller (2), and $u_{FF}$ is the term compensating for the backlash.

An ideal backlash compensation would be $$u_{FF} = \frac{d}{2} \text{sign}\left(\frac{du}{dt}\right). \quad (14)$$

This compensation is not realizable in a noisy environment. A possible modification is to filter the control signal before taking the derivative. It gives the following compensation $$u_{FF} = \frac{\delta}{2} \text{sign}\left(\frac{du_f}{dt}\right), \quad (15)$$

where $u_f$ is the filtered control signal. Note that the gain of the compensator is changed from the true backlash d to a value $\delta$, where $\delta \leq d$. The filtering of the control signal will introduce a delay in the detection of the sign changes of the control signal rate. This means that the control signal has already started its way through the backlash. Therefore, the compensation must be smaller than in the ideal case.

There are other possibilities to perform the backlash compensation. In (15), the control signal u has been passed trough a low-pass filter to reduce the noise introduced in the controller by the process output y. Inside the controller, the measurement signal is fed through a high-pass filter because of the derivative term. So, the noise level is first amplified and then reduced by the low-pass filter. A more direct way is to base the feedforward on the measurement signal directly. One approach that will be used in this document is $$u_{FF} = \frac{\delta}{2} \text{sign}(e), \quad (16)$$

where the control error is $e = y_{sp} - y_f$ and $y_f$ is the filtered process output given by (3). When the control error e changes sign, so does the rate of the integral term in the controller. Therefore, the feedforward (16) can be seen as an approach where only the noise-insensitive integral part of the controller is considered, and the noise-sensitive proportional and derivative parts are excluded from the compensation.

The backlash compensation will now be illustrated for the two examples from a previous section of this document.

Example 3

Backlash Compensation for an Integrating Process

Consider the control problem in Example 1. A backlash compensator of the form (15) is added to the controller. The filtered control signal is generated as $$U_f(s) = \frac{1}{(1 + sT_d/5)^2} U(s), \quad (17)$$

This is a filter with relatively high bandwidth. On the other hand, the process output is noise free in this example. Because of this, the gain of the compensator was chosen equal to the backlash, i.e. $\delta=d=0.05$, so the compensator coincides with the ideal compensator (14).

Figure 15:
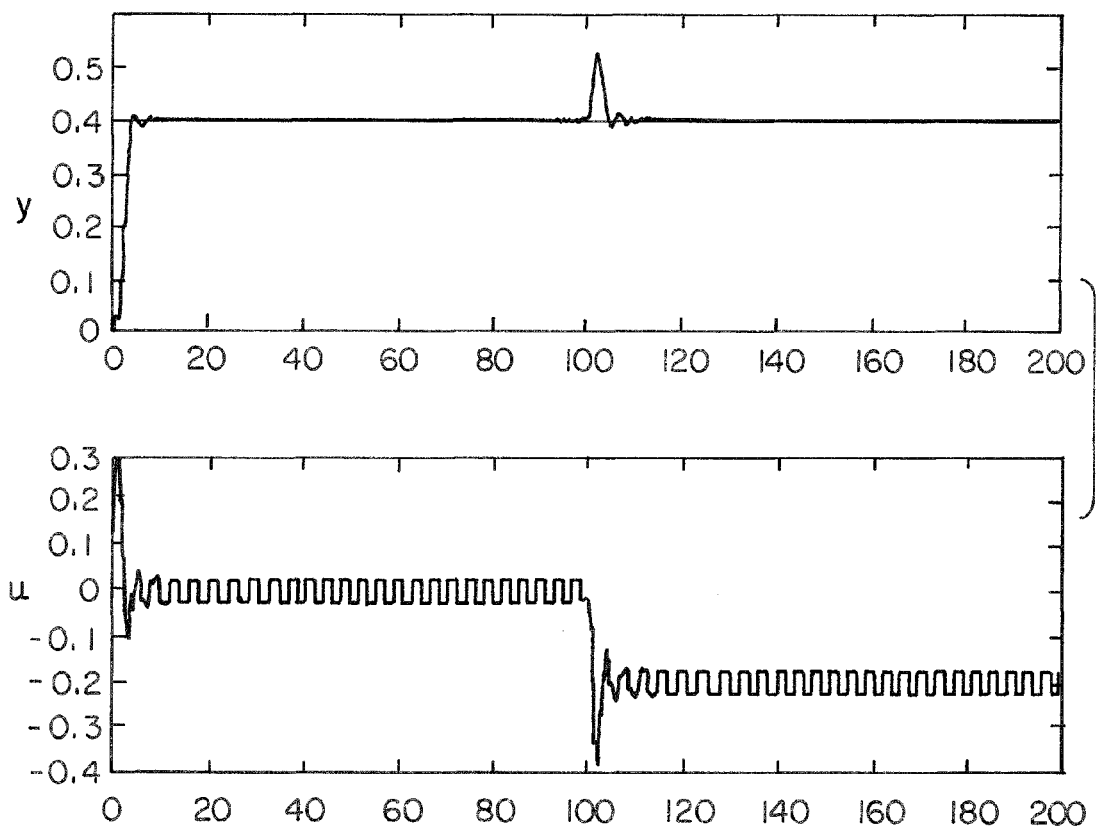
FIGS. 15-17 are diagrams which illustrate the effects of backlash compensation.

The results of the simulations are given in FIG. 15. Comparing FIGS. 5 and 15 it is obvious that the backlash compensator gives an almost ideal compensation in this noise-free case.

Example 4

Backlash Compensation for a Stable Process

Consider the control problem in Example 2. A backlash compensator of the form (16) is added to the controller. In this example, the compensation is more complicated than in the previous example, since the process output is corrupted with noise.

Figure 16:
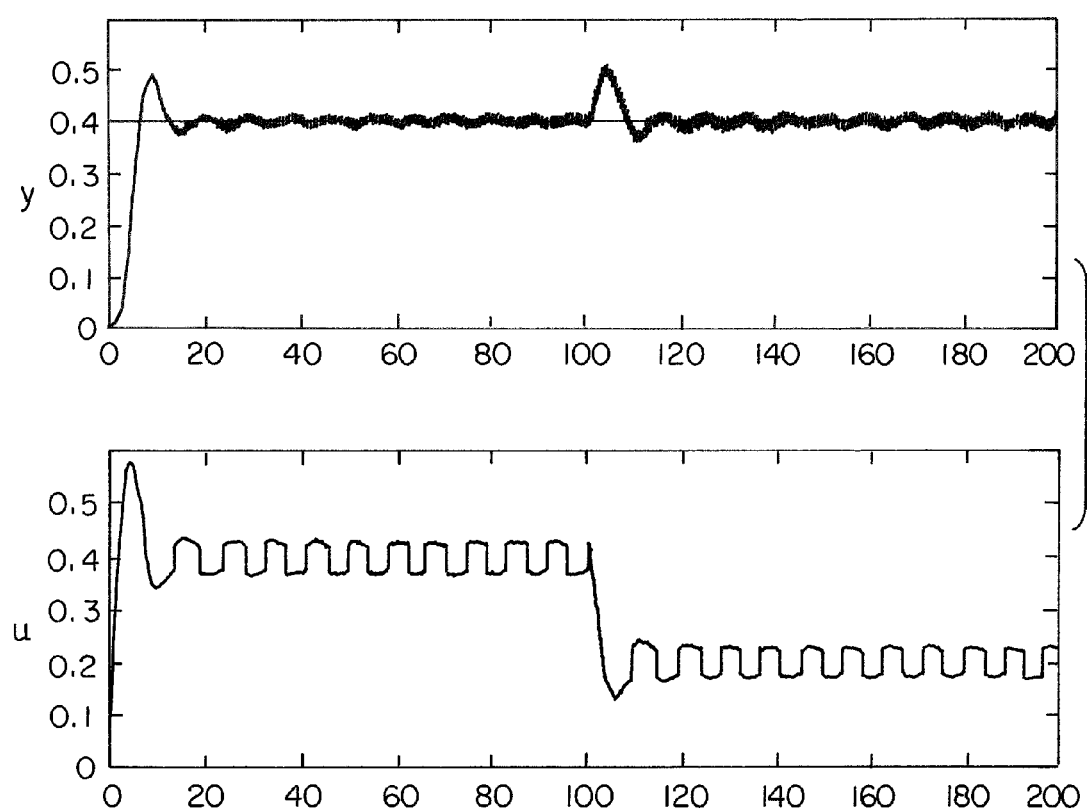
Figure 17:
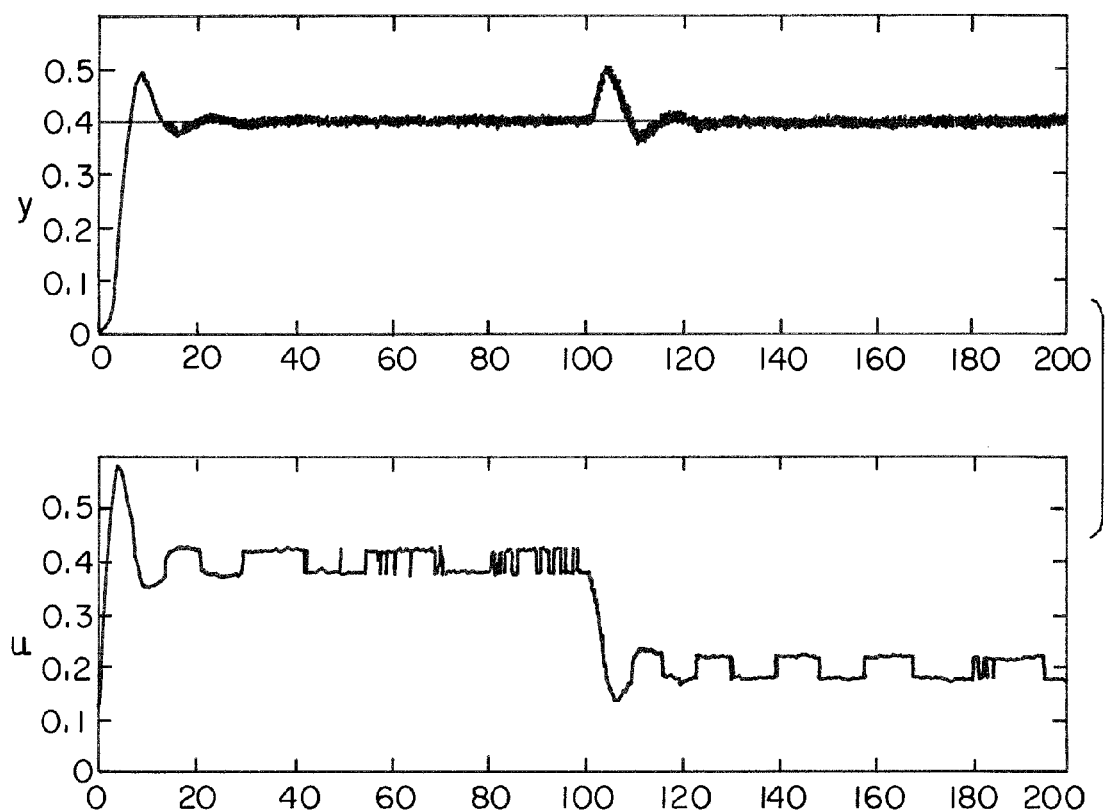

FIG. 16 shows the result when a compensator with $\delta=d=0.05$ is used. It is clear from the figure that the gain of the compensator is too high, and that the compensator causes the loop to oscillate. Reducing the compensator gain to $\delta=0.4$ gives the results shown in FIG. 17. This compensator gives a process output that is almost unaffected by the backlash. The control signal has some high-frequency shifts at certain periods. This could have been avoided by adjusting the filtering of the process output. On the other hand, these variations do not cause any valve movements because of the backlash.

FIG. 7 shows that a backlash of 5% gives an increased IAE value of about 45% when the load changes 20%. With the compensator, this increase is reduced to about 15%.

CONCLUDING REMARKS

Backlash (and stiction) in control valves is a major problem at the loop level in process control plants. There are two aspects of the problem. First of all, the nonlinearities deteriorate the control performance. But, an additional problem is that the loops facing these problems often remain undiscovered by the personnel in process control plants.

Procedures for detection of stiction and for compensation for stiction have been available for a number of years, and they are used in many industrial plants today. Compensation for backlash is simple as such, but the known procedures are seldom used in process control plants. The major reason for this is that no backlash detection and backlash on-line estimation method have been presented.

This document has presented an on-line method for detection and estimation of backlash in control loops. The method is automatic in the sense that no information has to be provided from the user. The only information needed except for the signals in the control system are the controller parameters. The effectiveness of the method has been demonstrated through simulations and industrial field tests.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for automatic estimation of backlash in a control system which includes a controller and a process to be controlled, wherein said controller is capable of performing integrating control of said process using one or more controller parameters to control a process output signal of said process with respect to a setpoint value thereof, the method being characterized by:

monitoring said process output signal to determine a value reflecting momentary differences between setpoint value and actual value of said process output signal during a time interval;

integrating a control error of said process during said time interval and determining said value as $$\Delta y = \int_{t_i}^{t_{i+1}} |e| dt / \Delta t,$$

where $\Delta t = t_{i+1} - t_i$ and $e = y_{sp} - y = $ (setpoint value of said process output signal) − (actual value of said mass output signal). ; and estimating the backlash from said determined value and said one or more controller parameters.

2. The method as defined in claim 1, wherein a start time of said time interval is determined by detecting a first zero crossing of said process output signal with respect to its setpoint value, and an end time of said time interval is determined by detecting a second zero crossing of said process output signal with respect to its setpoint value.

3. The method as defined in claim 1, comprising setting a static process gain of said process to a predetermined constant.

4. The method as defined in claim 3, wherein the predetermined constant is substantially 1.

5. The method as defined in claim 1, further involving load disturbance prevention by finding a maximum absolute difference between setpoint value and actual value of said process output signal during said time interval, verifying that said maximum absolute difference does not exceed a threshold value being a function of said determined value reflecting momentary differences between setpoint value and actual value of said process output signal, and performing said step of estimating the backlash only upon successful verification.

6. The method as defined in claim 5, wherein said threshold value is calculated by multiplying said determined value with a predetermined constant.

7. An apparatus for automatic estimation of backlash in a control system which includes a controller and a process to be controlled, wherein said controller is capable of performing integrating control of said process using one or more controller parameters to control a process output signal of said process with respect to a setpoint value thereof, the apparatus being characterized by:

means for monitoring said process output signal to determine a value re\-flecting momentary differences between setpoint value and actual value of said process output signal during a time interval;

means for integrating a control error of said process during said time interval and determining said value as $$\Delta y = \int_{t_i}^{t_{i-1}} |e|\, dt/\Delta t,$$

where $\Delta t = t_{i+1} - t_i$ and $e = y_{sp} - y =$ (setpoint value of said process output signal)−(actual value of said process output signal). ;and means for estimating the backlash from said determined value and said one or more controller parameters.

8. The apparatus as defined in claim 7, wherein said means for monitoring and said means for estimating are implemented by a processor of said controller.

9. A control system having a controller and a process to be controlled, wherein said controller is capable of performing integrating control of said process using one or more controller parameters to control a process output signal of said process with respect to a setpoint value thereof, the control system being characterized by:

means for monitoring said process output signal to determine a value reflecting momentary differences between setpoint value and actual value of said process output signal during a time interval;

means for integrating a control error of said process during said time interval and determining said value as $$\Delta y = \int_{t_i}^{t_{i-1}} |e|\, dt/\Delta t,$$

where $\Delta t = t_{i+1} - t_i$ and $e = y_{sp} - y =$ (setpoint value of said process output signal)−(actual value of said process output signal). ; and means for estimating the backlash from said determined value and said one or more controller parameters.

10. A computer program product comprising a non-transitory computer usable medium having computer readable program code stored thereon for execution by a processing device to perform a method of automatic estimation of backlash in a control system which includes a controller and a process to be controlled, wherein said controller is capable of performing integrating control of said process using one or more parameters to control a process output signal of said process with respect to a set-point value thereof, the method being characterized by:

establishing processing communication between said control system and said processing device to monitor said process, monitoring said process output signal to determine a value reflecting momentary differences between a setpoint value and an actual value of said process output signal during a time interval;

integrating a control error of said process during said time interval and determining said value as $$\Delta y = \int_{t_i}^{t_{i-1}} |e|\, dt/\Delta t,$$

where $\Delta t = t_{i+1} - t_i$ and $e = y_{sp} - y =$ (setpoint value of said process output signal)−(actual value of said process output signal), ; and estimating the backlash from said determined value and said one or more controller parameters.

11. A method for automatic estimation of backlash in a control system which includes a controller and a process to be controlled, wherein said controller is capable of performing integrating control of said process using one or more controller parameters to control a process output signal of said process with respect to a setpoint value thereof, the method being characterized by:

monitoring said process output signal to determine a value reflecting momentary differences between setpoint value and actual value of said process output signal during a time interval wherein a start time of said time interval is determined by detecting a first zero crossing of said process output signal with respect to its setpoint value, and an end time of said time interval is determined by detecting a second zero crossing of said process output signal with respect to its setpoint value;

integrating a control error of said process during said time interval and determining said value as $$\Delta y = \int_{t_i}^{t_{i+1}} |e|\, dt/\Delta t,$$

where $\Delta t = t_{i+1} - t_i$ and $e = y_{sp} - y =$ (setpoint value of said process output signal)−(actual value of said process output signal). ; and estimating the backlash from said determined value and said one or more controller parameters.

12. A control system having a controller and a process to be controlled, wherein said controller is capable of performing integrating control of said process using one or more controller parameters to control a process output signal of said process with respect to a setpoint value thereof, the control system being characterized by:

means for monitoring said process output signal to determine a value reflecting momentary differences between setpoint value and actual value of said process output signal during a time interval wherein a start time of said time interval is determined by detecting a first zero crossing of said process output signal with respect to its setpoint value, and an end time of said time interval is determined by detecting a second zero crossing of said process output signal with respect to its setpoint value;

means for integrating a control error of said process during said time interval and determining said value as $$\Delta y = \int_{t_i}^{t_{i+1}} |e|\, dt/\Delta t,$$

where $\Delta t = t_{i+1} - t_i$ and $e = y_{sp} - y =$ (setpoint value of said process output signal)−(actual value of said process output signal). ; and means for estimating the backlash from said determined value and said one or more controller parameters.

13. A control system as defined in claim 12, wherein means are arranged with associated memory capable of storing program code and work data to estimate the backlash from said determined value and said one or more controller parameters.

14. A method for automatic estimation of backlash in a control system which includes a controller and a process to be controlled, wherein said controller is capable of performing integrating control of said process using one or more controller parameters to control a process output signal of said process with respect to a setpoint value thereof, the method being characterized by:

monitoring said process output signal to determine a value reflecting momentary differences between setpoint value and actual value of said process output signal during a time interval; and estimating the backlash from said determined value and said one or more controller parameters;

wherein the backlash is estimated as $$\hat{d} = \left(\frac{K}{T_i}\Delta t - \frac{1}{K_p}\right)\Delta y,$$

where $\hat{d}$ is an estimation of a deadband caused by the backlash, $K$ and $T_i$ are controller parameters used by said controller for performing integrating control of said process, $\Delta t$ is said time interval, $\Delta y$ is said value reflecting momentary differences between setpoint value ($y_{sp}$) and actual value of said process output signal (y), and $K_p$ is a static process gain of said process.

15. A method for automatic estimation of backlash in a control system which includes a controller and a process to be controlled, wherein said controller is capable of performing integrating control of said process using one or more controller parameters to control a process output signal of said process with respect to a setpoint value thereof, the method being characterized by:

monitoring said process output signal to determine a value reflecting momentary differences between setpoint value and actual value of said process output signal during a time interval; and estimating the backlash from said determined value and said one or more controller parameters;

the backlash being caused by a controllable member in the control system, the method involving verifying that a control signal from said controller to said controllable member as well as said process output signal both have rates of change allowing for process dynamics to be neglected;

wherein the verification is performed by comparing said time interval to a closedloop time constant of said control system, said comparing is performed by approximating said closed-loop time constant with a time constant among said one or more controller parameters and checking whether said time interval exceeds a threshold value calculated by multiplying said time constant with a predetermined constant; and wherein said step of estimating the backlash is performed only upon successful verification.

* * * * *